(12) United States Patent
Godin et al.

(10) Patent No.: US 12,096,344 B2
(45) Date of Patent: Sep. 17, 2024

(54) FILTERED AUTHORIZATION LIST FOR PRIVATE NETWORKS

(71) Applicant: Nokia Solutions and Networks Oy, Espoo (FI)

(72) Inventors: Philippe Godin, Versailles (FR); Devaki Chandramouli, Plano, TX (US)

(73) Assignee: Nokia Technologies Oy, Espoo (FI)

( * ) Notice: Subject to any disclaimer, the term of this patent is extended or adjusted under 35 U.S.C. 154(b) by 400 days.

(21) Appl. No.: 17/634,179

(22) PCT Filed: Sep. 3, 2020

(86) PCT No.: PCT/IB2020/058221
§ 371 (c)(1),
(2) Date: Feb. 9, 2022

(87) PCT Pub. No.: WO2021/059055
PCT Pub. Date: Apr. 1, 2021

(65) Prior Publication Data
US 2022/0322214 A1    Oct. 6, 2022

Related U.S. Application Data

(60) Provisional application No. 62/906,874, filed on Sep. 27, 2019.

(51) Int. Cl.
H04W 48/16    (2009.01)
(52) U.S. Cl.
CPC .................................. H04W 48/16 (2013.01)
(58) Field of Classification Search
CPC ...................................................... H04W 48/16
USPC ......................................................... 455/434
See application file for complete search history.

(56) References Cited

U.S. PATENT DOCUMENTS

| 2009/0047960 A1 | 2/2009 | Gunnarsson et al. |
| 2013/0005328 A1 | 1/2013 | De Benedittis et al. |
| 2019/0246342 A1 | 8/2019 | Wang et al. |

FOREIGN PATENT DOCUMENTS

WO    2019/031515 A1    2/2019

OTHER PUBLICATIONS

"New Work Item Proposal on Private Network Support for NG-RAN", 3GPP TSG RAN Meeting #83, RP-190729, Agenda: 9.1.3, China Telecom, Mar. 18-21, 2019, 5 pages.

(Continued)

*Primary Examiner* — Joel Ajayi
(74) *Attorney, Agent, or Firm* — Barta Jones, PLLC

(57) ABSTRACT

In accordance with an example embodiment of the present invention, a method comprising: receiving, at a network node of a registration area (RA), a list of cells and their associated tracking area identities (TAIs) from at least one other network node of the RA; determining which of the received TAIs are neighbouring TAIs of one of the TAIs of the network node; building a list of neighbouring TAIs corresponding to the at least one other network node; transmitting, to a network management entity, a list of closed access group identifiers (CAG IDs) supported by the network node's TAIs and the list of neighbouring TAIs corresponding to the at least one other network node; and receiving, from the network management entity, a list of user equipment (UE) allowed CAG IDs.

20 Claims, 5 Drawing Sheets

(56) References Cited

OTHER PUBLICATIONS

"3rd Generation Partnership Project; Technical Specification Group Services and System Aspects; System Architecture for the 5G System; Stage 2 (Release 16)", 3GPP TS 23.501, V16.1.0, Jun. 2019, pp. 1-368.
"LS on clarifications on Private Networks", 3GPP TSG-RAN WG3#105, R3-194786, RAN3, Aug. 26-30, 2019, 1 page.
"NPN: Corrections to handling of Allowed CAG list and CAG-only indication", 3GPP TSG-SA2 Meeting #133, S2-1905209, MediaTek In, May 13-17, 2019, pp. 1-3.
"Connected mode mobility for Public network integrated NPN", 3GPP TSG-RAN WG3#105, S2-1903619, ZTE, Apr. 8-12, 2019, 3 pages.
"Discussion on the Public network integrated NPN", SA WG2 Meeting #132, S2-1903615, Agenda: 6.15.3, ZTE, Apr. 8-12, 2019, pp. 1-2.
"Discussion on the connected mode mobility for Public network integrated NPN", SA WG2 Meeting #132, S2-1903618, Agenda: 6.15.3, ZTE, Apr. 8-12, 2019, pp. 1-2.
International Search Report and Written Opinion received for corresponding Patent Cooperation Treaty Application No. PCT/IB2020/058221, dated Dec. 8, 2020, 24 pages.
"General support of public network integrated NPN", 3GPP TSG-RAN3 Meeting #105, R3-194413, Agenda: 16.2.1, Huawei, Aug. 26-30, 2019, pp. 1-5.
"Way Forward with private networks", 3GPP TSG-RAN WG3#105, R3-194686, Agenda: 16.2, Nokia, Aug. 26-30, 2019, pp. 1-5.
Office Action received for corresponding European Patent Application No. 20768712.0, dated Apr. 23, 2024, 6 pages.

FILTERED AUTHORIZATION LIST FOR PRIVATE NETWORKS

RELATED APPLICATION

This application claims priority to PCT Application No. PCT/IB2020/058221 filed Sep. 3, 2020 which claims priority to benefit to U.S. Application No. 62/906,874 filed Sep. 27, 2019 each of which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for supporting public network integrated non-public networks (PNI-NPN) in such communications systems.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR provides bitrates on the order of 10-20 Gbit/s or higher, and can support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE radio access. It is noted that, in 5G, the nodes that can provide radio access functionality to a user equipment (i.e., similar to Node B in UTRAN or eNB in LTE) may be named gNB when built on NR radio and may be named NG-eNB when built on LTE/E-UTRA radio.

SUMMARY

Various aspects of examples of the invention are set out in the claims.

According to a first aspect of the present invention, a method comprising: receiving, at a network node of a registration area (RA), a list of cells and their associated tracking area identities (TAIs) from at least one other network node of the RA; determining which of the received TAIs are neighbouring TAIs of one of the TAIs of the network node; building a list of neighbouring TAIs corresponding to the at least one other network node; transmitting, to a network management entity, a list of closed access group identifiers (CAG IDs) supported by the network node's TAIs and the list of neighbouring TAIs corresponding to the at least one other network node; and receiving, from the network management entity, a list of user equipment (UE) allowed CAG IDs.

According to a second aspect of the present invention, an apparatus comprising: at least one processor; and at least one memory including computer program code, wherein the at least one memory and the computer program code are configured, with the at least one processor, to cause the apparatus to at least: receive, at the apparatus of a registration area (RA), a list of cells and their associated tracking area identities (TAIs) from at least one other network node of the RA; determine which of the received TAIs are neighbouring TAIs of one of the TAIs of the apparatus; build a list of neighbouring TAIs corresponding to the at least one other network node; transmit, to a network management entity, a list of closed access group identifiers (CAG IDs) supported by the apparatus' TAIs and the list of neighbouring TAIs corresponding to the at least one other network node; and receive, from the network management entity, a list of user equipment (UE) allowed CAG IDs.

According to a third aspect of the present invention, A non-transitory computer storage medium encoded with a computer program, the program comprising instructions that when executed by one or more computers cause the one or more computers to perform operations comprising: receiving, at a network node of a registration area (RA), a list of cells and their associated tracking area identities (TAIs) from at least one other network node of the RA; determining which of the received TAIs are neighbouring TAIs of one of the TAIs of the network node; building a list of neighbouring TAIs corresponding to the at least one other network node; transmitting, to a network management entity, a list of closed access group identifiers (CAG IDs) supported by the network node's TAIs and the list of neighbouring TAIs corresponding to the at least one other network node; and receiving, from the network management entity, a list of user equipment (UE) allowed CAG IDs.

According to a fourth aspect of the present invention, an apparatus comprising: means for receiving, at the apparatus of a registration area (RA), a list of cells and their associated tracking area identities (TAIs) from at least one other network node of the RA; means for determining which of the received TAIs are neighbouring TAIs of one of the TAIs of the apparatus; means for building a list of neighbouring TAIs corresponding to the at least one other apparatus; means for transmitting, to a network management entity, a list of closed access group identifiers (CAG IDs) supported by the apparatus' TAIs and the list of neighbouring TAIs corresponding to the at least one other network node; and means for receiving, from the network management entity, a list of user equipment (UE) allowed CAG IDs.

According to a fifth aspect of the present invention, a method comprising: receiving, from at least one network node of a registration area (RA), information including a list of closed access group identifiers (CAG IDs) supported by the at least one network node's tracking area identities (TAIs) and a list of neighbouring TAIs corresponding to one or more other network nodes of the RA neighbouring the at least one network node; determining, based on the received information, a list of CAG IDs supported in the RA and CAG IDs supported by TAIs neighbouring the RA to produce a list of user equipment (UE) allowed CAG IDs; filtering the list of UE allowed CAG IDs to derive a subset list of UE allowed CAG IDs; and transmitting to the at least one network node the subset list of UE allowed CAG IDs.

According to a sixth aspect of the present invention, an apparatus comprising: at least one processor; and at least one memory including computer program code, wherein the at least one memory and the computer program code are configured, with the at least one processor, to cause the apparatus to at least: receive, from at least one network node of a registration area (RA), information including a list of closed access group identifiers (CAG IDs) supported by the at least one network node's tracking area identities (TAIs) and a list of neighbouring TAIs corresponding to one or more other network nodes of the RA neighbouring the at least one network node; determine, based on the received information, a list of CAG IDs supported in the RA and CAG IDs supported by TAIs neighbouring the RA to produce a list of user equipment (UE) allowed CAG IDs; filter the list of UE allowed CAG IDs to derive a subset list of UE allowed CAG IDs; and transmit to the at least one network node the subset list of UE allowed CAG IDs.

According to a seventh aspect of the present invention, A non-transitory computer storage medium encoded with a computer program, the program comprising instructions that when executed by one or more computers cause the one or more computers to perform operations comprising: receiving, from at least one network node of a registration area (RA), information including a list of closed access group identifiers (CAG IDs) supported by the at least one network node's tracking area identities (TAIs) and a list of neighbouring TAIs corresponding to one or more other network nodes of the RA neighbouring the at least one network node; determining, based on the received information, a list of CAG IDs supported in the RA and CAG IDs supported by TAIs neighbouring the RA to produce a list of user equipment (UE) allowed CAG IDs; filtering the list of UE allowed CAG IDs to derive a subset list of UE allowed CAG IDs; and transmitting to the at least one network node the subset list of UE allowed CAG IDs.

According to an eighth aspect of the present invention, an apparatus comprising: means for receiving, from at least one network node of a registration area (RA), information including a list of closed access group identifiers (CAG IDs) supported by the at least one network node's tracking area identities (TAIs) and a list of neighbouring TAIs corresponding to one or more other network nodes of the RA neighbouring the at least one network node; means for determining, based on the received information, a list of CAG IDs supported in the RA and CAG IDs supported by TAIs neighbouring the RA to produce a list of user equipment (UE) allowed CAG IDs; means for filtering the list of UE allowed CAG IDs to derive a subset list of UE allowed CAG IDs; and means for transmitting to the at least one network node the subset list of UE allowed CAG IDs.

BRIEF DESCRIPTION OF THE DRAWINGS

For proper understanding of example embodiments, reference should be made to the accompanying drawings, wherein.

DETAILED DESCRIPTION

Figure 1:
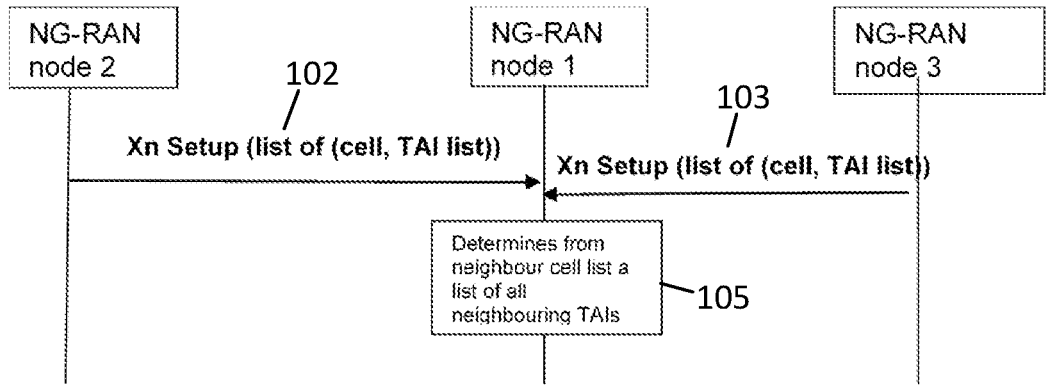
FIG. 1 illustrates an example signaling flow diagram, according to an embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for supporting public network integrated non-public networks (PNI-NPN), is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as merely illustrative of the principles and teachings of certain example embodiments, and not in limitation thereof.

It is expected that public network integrated Non Public Networks (PNI-NPN) will be supported as part of the $3^{rd}$ generation partnership project (3GPP) radio access network (RAN) work item on support of private networks in 5G. Pursuant to the features of PNI-NPN, a UE can be associated with a list of UE allowed closed access group (CAG) identifiers (IDs) identifying the closed access groups to which the UE belongs. A CAG cell in the NG-RAN can support one or more CAG IDs. A UE is authorized to access a cell of the public land mobile network (PLMN) if at least one of the UE allowed CAG IDs is supported in the cell.

In order for the NG-RAN to control that a UE is allowed to access a cell in connected mode mobility, or simply to enable the NG-RAN to select suitable cells for the UE in connected mode mobility, the NG-RAN node needs to be aware of this list of UE allowed CAG IDs. Therefore, the access management function (AMF) provides the list of UE allowed CAG IDs to the NG-RAN node within a Mobility Restriction List information element (IE), which is sent in NG application protocol (NGAP) messages creating a context for the UE in the NG-RAN node, e.g., in Initial Context Setup.

Given that one or more CAG ID(s) may be associated to one private network and that a UE may be authorized to access tens of private networks in a full country, the list of UE allowed CAG IDs to be included in the Mobility restriction list IE can be very large leading to signalling overhead. This can also increase the processing load in the NG-RAN nodes whenever mobility checks must be done. As such, it would be desirable to reduce this list by some filtering mechanism.

It would be sufficient if the NG-RAN node would know the list of UE allowed CAG IDs, which is useful as long as the UE is in the current registration area (RA), because whenever a UE changes RA the AMF has the opportunity to download a new updated list of UE allowed CAG IDs. This updated list may be referred to herein as the RA-useful list of UE allowed CAG IDs. Obviously, this list is smaller than the full list of UE allowed CAG IDs for the full PLMN.

In order to suitably determine the mobility of the UE in connected mode this RA-useful list of UE allowed CAG IDs may contain: (1) the list of all CAG IDs supported by the cells comprising the current RA, and/or (2) the list of all CAG IDs supported by the cells comprising a Tracking Area (TA) which is neighbouring the RA (because the UE can trigger the change of RA in such a neighbouring TA).

The AMF can determine the list of all CAG IDs supported by the cells comprising the current RA, as discussed in the following. First, it has already been proposed that an NG-RAN node sends, at NG setup request to the AMF, the list of CAG IDs which it supports and the NG-RAN node also sends in this message the list of TAs it supports. It is therefore possible to organize the signalling of the CAG IDs that a NG-RAN node supports in the NG setup request per TA. The AMF can then obtain the list of all CAG IDs supported by the cells comprising the current RA by cumulating the CAG ID lists of all the TAs comprising the RA received from the NG-RAN nodes involved in the RA. However, currently, the AMF cannot determine the list of all CAG IDs supported by the cells comprising a Tracking Area (TA) that is neighbouring the RA, because the AMF has no idea of which TAs are neighbouring the RA.

Each NG-RAN node of the RA may comprise cells of one or more TAs. For each of these TAs, the NG-RAN node can determine the neighbouring TAs by looking at the TA associated with neighbouring cells. The NG-RAN node should also know what are the CAG IDs supported by each of these neighbouring TAs, because a neighbouring TA has cells belonging to a neighbour NG-RAN node which has communicated its list of supported CAG IDs per cell over Xn, e.g., during Xn setup message.

In one embodiment, a NG-RAN node is configured to report, to the AMF, the CAG IDs that the NG-RAN node supports per TA, and the TAs that are neighbouring its TAs. As mentioned above, the NG-RAN node may determine the TAs that are neighbouring its TAs from Xn setup messages previously received from neighbour NG-RAN nodes. For any of these neighbouring TA(s) the AMF is supposed to have received the list of supported CAG IDs from other NG-RAN nodes. According to an embodiment, using this list of supported CAG IDs received from the other NG-RAN nodes, the AMF may be configured to build the list of CAG IDs supported by the cells of all the neighbouring TAs. According to some embodiments, the AMF may be configured to use one or more of the received CAG IDs to filter the list of UE allowed CAG IDs, for example, to determine the RA-useful list of UE allowed CAG IDs. In certain embodiments, when the UE becomes connected via an NG-RAN node of the RA, the AMF may further send to this NG-RAN node the RA-useful list of UE allowed CAG IDs, for example, within the Mobility Restriction List IE in the initial context setup message.

In an embodiment, a NG-RAN node may be configured to report, to the AMF, the CAG IDs that the NG-RAN node supports per TA, and the CAG IDs supported by the cells of TAs which are neighbouring its TAs (e.g., which it has previously received in Xn Setup from neighbour NG-RAN nodes). According to an embodiment, the AMF may be configured to use the received CAG IDs from at least one NG-RAN node to filter the list of UE allowed CAG IDs, e.g., to determine the RA-useful list of UE allowed CAG IDs. In certain embodiments, when the UE becomes connected via an NG-RAN node of the RA, the AMF may be configured to further send to this NG-RAN node this RA-useful list of UE allowed CAG IDs within the Mobility Restriction List IE in the initial context setup message.

It is noted that, in a further embodiment, the list of neighbouring tracking area identities (TAIs) reported by the NG-RAN node may be further used by the AMF for purposes other than those discussed above.

FIG. 1 illustrates an example signaling diagram or message flow, according to certain embodiments. As illustrated in the example of FIG. 1, at 102 and 103, NG-RAN node 1 may receive, from NG-RAN node 2 and/or NG-RAN node 3, a list of cells with their TAIs in an Xn setup message, for example. It is noted that NG-RAN node 2 and/or NG-RAN node 3 may or may not be in the RA of NG-RAN node 1. In an embodiment, NG-RAN node 1 may determine, at 105, which of the received TAIs are neighbouring TAIs of one of its own TAIs from the knowledge of which cells are neighbouring cells of its own cells. With this, NG-RAN node 1 can build the list of all neighbouring TAIs corresponding to NG-RAN node 2 and/or NG-RAN node 3. It is noted that NG-RAN node 1 can do the same with any NG-RAN node(s) x from which it exchanges an Xn setup procedure, and these NG-RAN node(s) x may be outside the RA of NG-RAN node 1. As a result, NG-RAN node 1 can build a complete list of its neighbouring TAIs.

Figure 2:
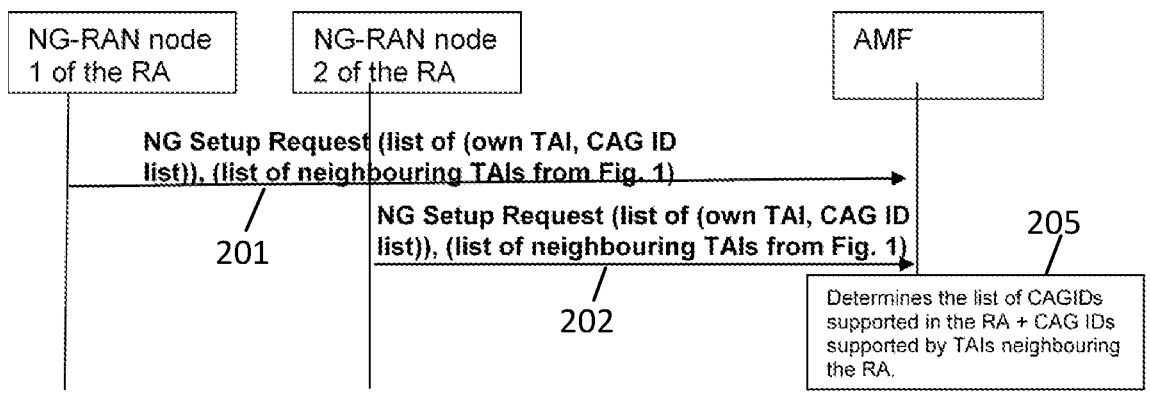
FIG. 2 illustrates an example signaling flow diagram, according to an embodiment.

FIG. 2 illustrates another example signaling diagram or message flow, according to certain embodiments. As illustrated in the example of FIG. 2, at 201, NG-RAN node 1 may send to the AMF for each of its own TAIs the list of all CAG IDs supported by the TAI (sum of all CAG IDs supported by the cells comprising the TAI). NG-RAN node 1 may also send, to the AMF, the list of all neighbouring TAIs it is aware of as built at FIG. 1 discussed above. As also illustrated in the example of FIG. 2, NG-RAN node 2 may similarly send, to the AMF, its list of all CAG IDs supported by its TAIs and its list of neighbouring TAIs it is aware of. It is noted that other NG-RAN nodes may similarly provide their lists to the AMF. At 205, the AMF may then build, from the information received from all the NG-RAN nodes of the RA, the list of CAG IDs supported by the TAIs comprising the RA of the UE and the list of CAG IDs supported by the TAIs neighbouring the TAIs comprising the RA. As such, the AMF may combine the information received by the NG-RAN nodes of the RA and the NG-RAN nodes neighboring the RA to build the RA-related list of CAG IDs which corresponds to the list of CAG IDs supported in the RA region and in the TAIs neighboring the RA.

Figure 3:
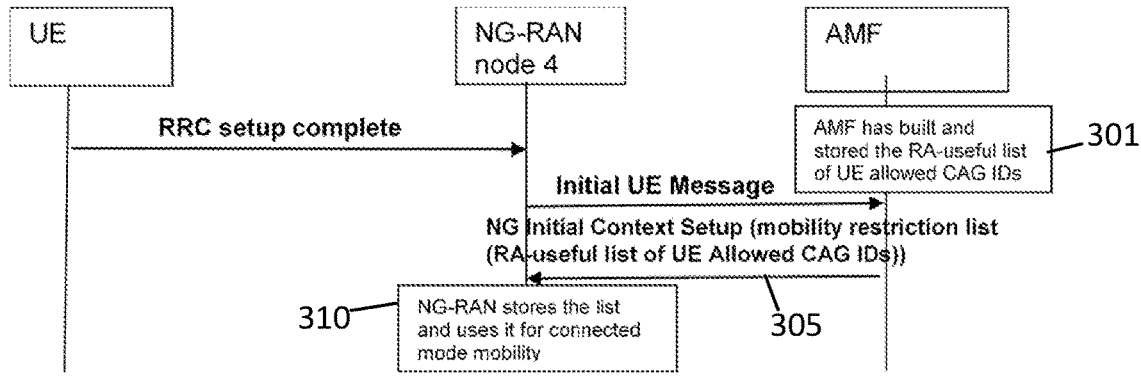
FIG. 3 illustrates an example signaling flow diagram, according to an embodiment.

FIG. 3 illustrates another example signaling diagram or message flow, according to certain embodiments. As illustrated in the example of FIG. 3, at 301, using the RA-related list of CAG IDs i.e. the list of CAG IDs supported by the TAIs comprising the RA of the UE plus the list of CAG IDs supported by the TAIs neighbouring the TAIs comprising the RA, the AMF can filter the full PLMN wide list of UE allowed CAG IDs to derive the RA-useful list of UE allowed CAG IDs. Then, when the UE becomes connected via an NG-RAN node 4 of its RA, the AMF may send, at 305, the RA-useful list of UE allowed CAG IDs to the NG-RAN node 4 of the RA, e.g., within a Mobility Restriction List IE contained in the NGAP initial context setup request message and may also send the RA-useful list of UE allowed CAGIDs to the UE. NG-RAN node 4 may store, at 310, the received RA-useful list of UE allowed CAG IDs and may use it for connected mode mobility and UE may also use it for idle mode purposes.

Figure 4:
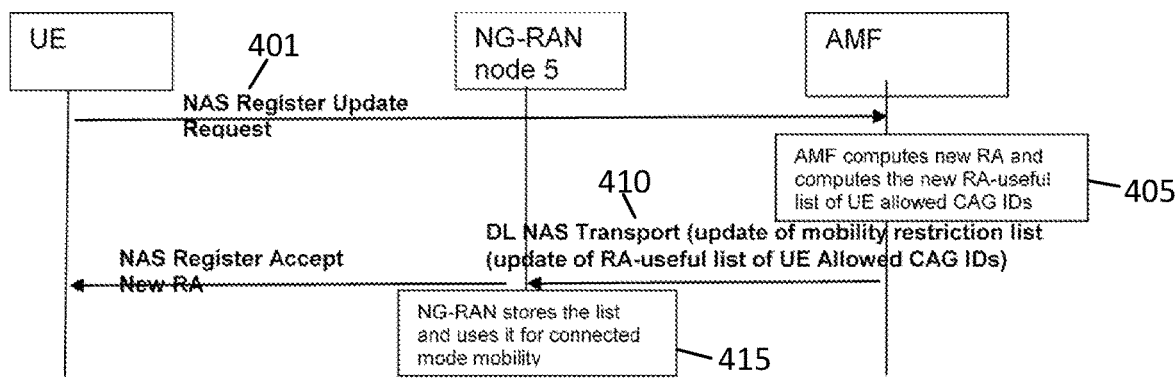
FIG. 4 illustrates an example signaling flow diagram, according to an embodiment.

FIG. 4 illustrates another example signaling diagram or message flow, according to certain embodiments. As illustrated in the example of FIG. 4, when the UE changes to a new RA via an NG-RAN node 5 of a neighbouring TAI, at 401, the UE may send a NAS Registration update message to the AMF. In this example, at 405, the AMF may re-compute the new RA-useful list of UE allowed CAG IDs corresponding to the new RA and may send, at 410, the updated list to the NG-RAN node 5 when it sends the new RA towards the UE. In an embodiment, the AMF may also send the new RA-useful list of UE allowed CAG IDs to the UE. At 415, NG-RAN node 5 may store the updated RA-useful list of UE allowed CAG IDs and may use it for connected mode mobility, and the UE may use the updated RA-useful list of UE allowed CAG IDs for idle mode mobility.

Figure 5A:
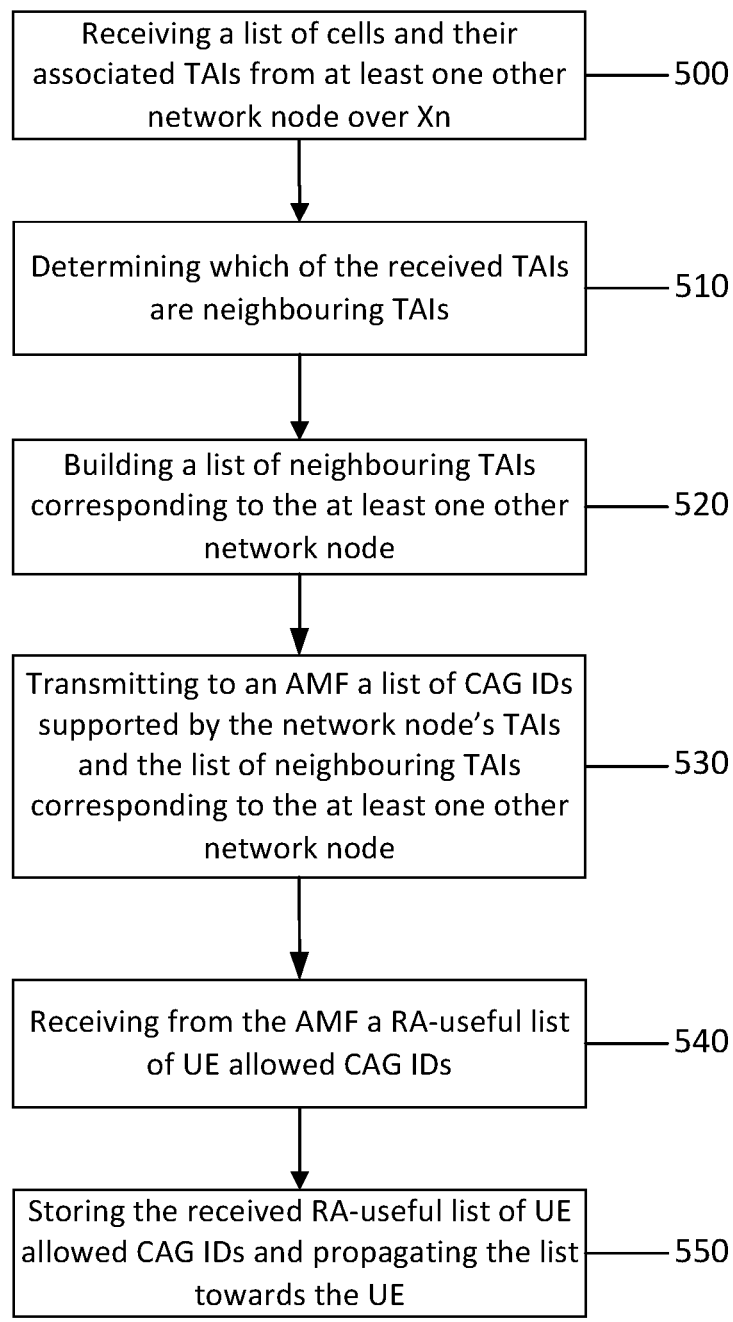
FIG. 5a illustrates an example flow diagram of a method, according to an embodiment.

FIG. 5a illustrates an example flow diagram of a method for supporting private networks in 5G, according to one example embodiment. In certain example embodiments, the flow diagram of FIG. 5a may be performed by a network entity or network node in a communication system, such as LTE or 5G NR. For instance, in some example embodiments, the method of FIG. 5a may be performed by a base station, access point, NG-RAN node, eNB and/or gNB, or other network node.

As illustrated in the example of FIG. 5a, at 500, the method may include receiving, at a network node of a RA, a list of cells and their associated TAIs from at least one other network node, which may be connected over Xn. For example, the receiving 500 may include receiving the list in an Xn setup message. In certain embodiments, the method may then include, at 510, determining which of the received TAIs are neighbouring TAIs of one of the TAIs of the network node, for example, using knowledge of which cells are neighbouring cells of the network node's own cells.

In an embodiment, the method of FIG. 5a may also include, at 520, building a list of neighbouring TAIs corresponding to the at least one other network node. According to some embodiments, the method may include, at 530, transmitting to an AMF a list of CAG IDs supported by the network node's TAIs and the list of neighbouring TAIs corresponding to the at least one other network node. Then, for instance when a UE connects via a network node of its RA, the method may include, at 540, receiving from the AMF a RA-useful list of UE allowed CAG IDs. In one example, the receiving 540 may include receiving the RA-useful list of UE allowed CAG IDs within a mobility restriction list IE contained in a NGAP initial context setup request message. According to some embodiments, the method may further include, at 550, storing the received RA-useful list of UE allowed CAG IDs, and optionally using it for connected mode mobility and propagating the RA-useful list of UE allowed CAG IDs towards the UE.

Figure 5B:
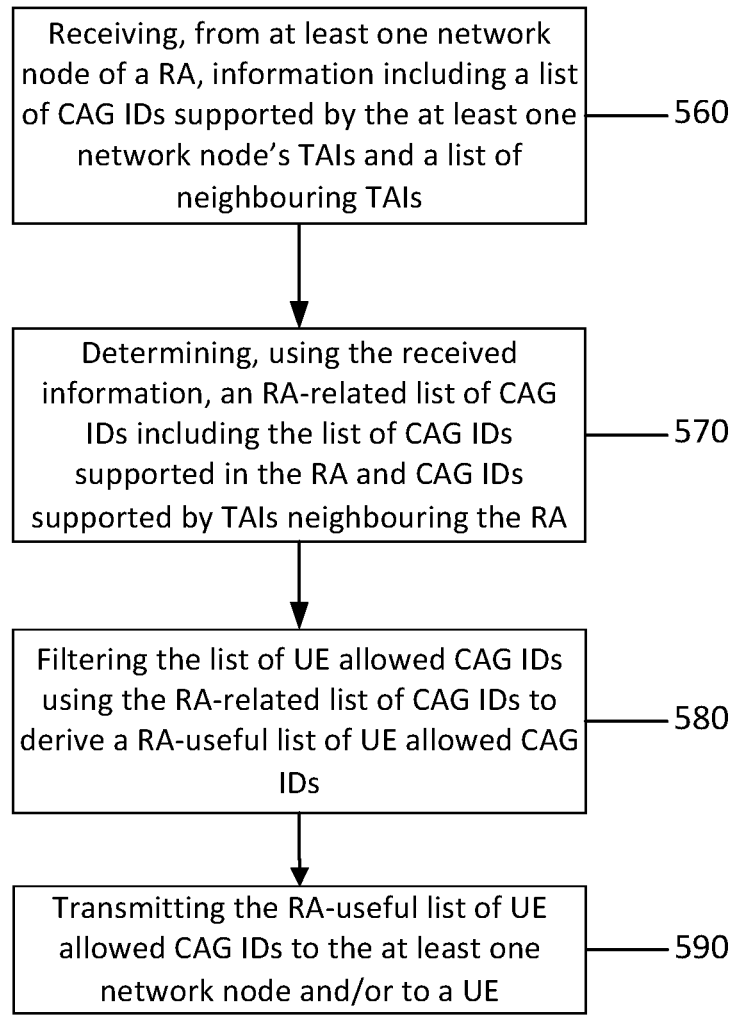
FIG. 5b illustrates an example flow diagram of a method, according to an embodiment.

FIG. 5b illustrates an example flow diagram of a method for supporting private networks in 5G, according to one example embodiment. In certain example embodiments, the flow diagram of FIG. 5b may be performed by a network entity or network node in a communication system, such as LTE or 5G NR. For instance, in some example embodiments, the method of FIG. 5b may be performed by an AMF, or other access or management network node.

As illustrated in the example of FIG. 5b, at 560, the method may include receiving, from at least one network node of a RA, information including a list of CAG IDs supported by the at least one network node's TAIs and a list of neighbouring TAIs corresponding to one or more other network nodes neighbouring the at least one network node. According to certain embodiments, the one or more other network nodes may or may not belong to the RA of the at least one network node. In an embodiment, the method may also include, at 570, determining, using the received information, an RA-related list of CAG IDs including the list of CAG IDs supported in the RA and CAG IDs supported by TAIs neighbouring the RA. According to certain embodiments, the method may then include, at 580, filtering the list of UE allowed CAG IDs using the RA-related list of CAG IDs to derive a RA-useful list of UE allowed CAG IDs.

In some embodiments, when a UE connects to the at least one network node of its RA, the method may include, at 590, transmitting to the at least one network node the RA-useful list of UE allowed CAG IDs. In an embodiment, the RA-useful list of UE allowed CAG IDs may also be sent to the UE. In one example, the transmitting 590 may include transmitting the RA-useful list of UE allowed CAG IDs within a mobility restriction list IE contained in a NGAP initial context setup request message and/or transmitting the RA-useful list of UE allowed CAG IDs to the UE. According to certain embodiments, the method may further include, when the UE changes to a new RA via a network node of a neighbouring TAI, computing an updated RA-useful list of UE allowed CAG IDs and transmitting the updated list to the network node of the neighbouring TAI and/or to the UE.

Figure 6A:
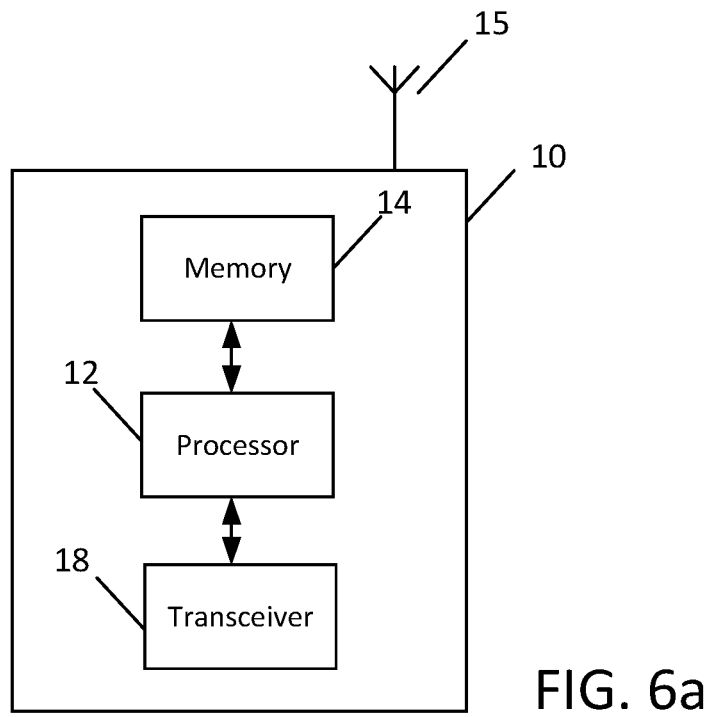
FIG. 6a illustrates an example block diagram of an apparatus, according to an embodiment.

FIG. 6a illustrates an example of an apparatus 10 according to an embodiment. In an embodiment, apparatus 10 may be a node, host, or server in a communications network or serving such a network. For example, apparatus 10 may be a satellite, base station, a Node B, an evolved Node B (eNB), 5G Node B or access point, NG-RAN node, next generation Node B (NG-NB or gNB), and/or WLAN access point, associated with a radio access network, such as a LTE network, 5G or NR. In example embodiments, apparatus 10 may represent a NG-RAN node.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 6a.

As illustrated in the example of FIG. 6a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 6a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node, RAN node, or NG-RAN node, such as a base station, access point, Node B, eNB, gNB, WLAN access point, or the like. According to certain embodiments, apparatus 10 may be controlled by memory 14 and processor 12 to perform the functions associated with any of the example embodiments described herein, such as the flow or signaling diagrams illustrated in FIG. 1-4, 5a or 5b. In some embodiments, apparatus 10 may be configured to perform procedures for supporting private networks, for example. In an embodiment, apparatus 10 may represent a network node of a RA, such as a NG-RAN node of a RA.

In an embodiment, apparatus 10 may be controlled by memory 14 and processor 12 to receive a list of cells and their associated TAIs from at least one other network node, which may be connected to the apparatus 10 over Xn. For example, the list may be received in an Xn setup message. In certain embodiments, apparatus 10 may be controlled by memory 14 and processor 12 to determine which of the received TAIs are neighbouring TAIs of one of the TAIs of the apparatus 10, for example, using knowledge of which cells are neighbouring cells of the cells of apparatus 10.

In an embodiment, apparatus 10 may be controlled by memory 14 and processor 12 to build a list of neighbouring TAIs corresponding to the at least one other network node. According to some embodiments, apparatus 10 may be controlled by memory 14 and processor 12 to transmit to an AMF a list of CAG IDs supported by the TAIs of apparatus 10 and the list of neighbouring TAIs corresponding to the at least one other network node. Then, for example when a UE connects via a network node of its RA, apparatus 10 may be controlled by memory 14 and processor 12 to receive from the AMF a RA-useful list of UE allowed CAG IDs. In one example, the RA-useful list of UE allowed CAG IDs may be received within a mobility restriction list IE contained in a NGAP initial context setup request message. According to some embodiments, apparatus 10 may be controlled by memory 14 and processor 12 to store the received RA-useful list of UE allowed CAG IDs and to optionally use it for connected mode mobility. In an embodiment, apparatus 10 may also be controlled to propagate the RA-useful list UE allowed CAG IDs towards the UE.

Figure 6B:
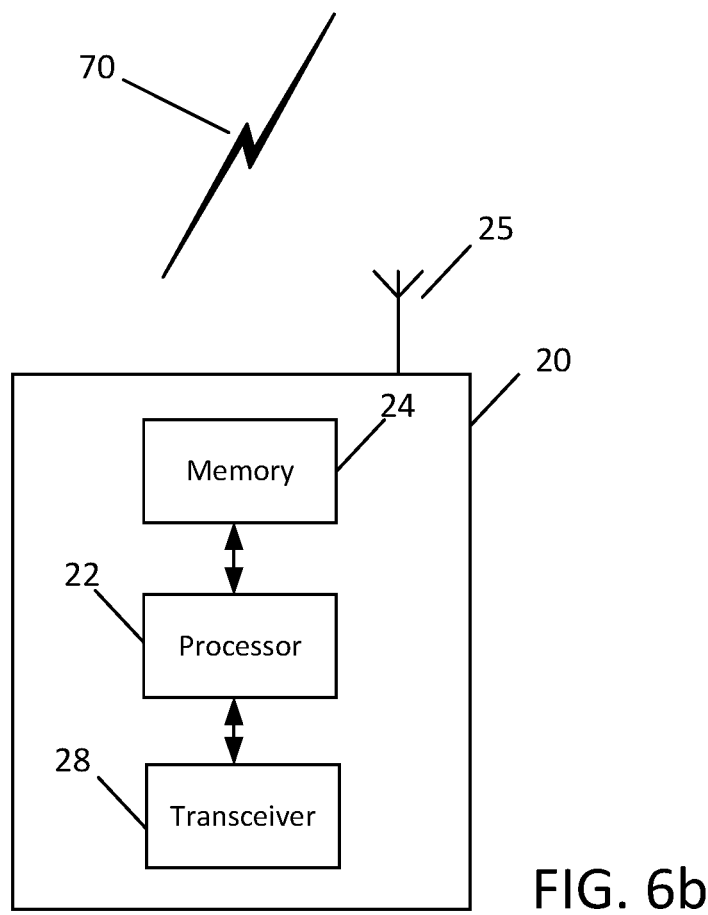
FIG. 6b illustrates an example block diagram of an apparatus, according to an embodiment.

FIG. 6b illustrates an apparatus 20 according to an example embodiment. In an example embodiment, the apparatus 20 may be a node, host, or server in a communication network or serving such a network. For example, apparatus 20 may be a satellite, base station, a Node B, an evolved Node B (eNB), 5G Node B or access point, next generation Node B (NG-NB or gNB), and/or WLAN access point, associated with a radio access network (RAN), such as an LTE network, 5G or NR. In one embodiment, may be an AMF, or other access or management network node. It should be noted that one of ordinary skill in the art would understand that apparatus 20 may include components or features not shown in FIG. 6b.

As illustrated in the example of FIG. 6b, apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 6b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster.

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIG. 2.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform at least the methods illustrated in FIGS. 1-5.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other embodiments, transceiver 18 may be capable of transmitting and receiving signals or data directly. Additionally or alternatively, in some embodiments, apparatus 20 may include an input and/or output device (I/O device).

According to an example embodiment, apparatus 20 may optionally be configured to communicate with apparatus 10 via a wireless or wired communications link 70 according to any radio access technology, such as NR. In one embodiment, link 70 may represent a Xn interface.

In an embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some embodiments, processor 22 and memory 24 may be included in or may form a part of processing circuitry or control circuitry. In addition, in some embodiments, transceiver 28 may be included in or may form a part of transceiving circuitry.

As introduced above, in certain embodiments, apparatus 20 may be a node, host, or server in a communication network or serving such a network. For example, apparatus 20 may be an AMF, or other access or management node, associated with a radio access network (RAN), such as an LTE network, 5G or NR. According to certain embodiments, apparatus 20 may be controlled by memory 24 and processor 22 to perform the procedures associated with any of the example embodiments described herein, such as those illustrated in FIGS. 1-5. For instance, in an embodiment, apparatus 20 may be controlled by memory 24 and processor 22 to perform a process for building a filtered authorization list for private networks.

According to certain embodiments, apparatus 20 may be controlled by memory 24 and processor 22 to receive, from at least one network node of a RA, information including a list of CAG IDs supported by the at least one network node's TAIs and a list of neighbouring TAIs corresponding to one or more other network nodes neighbouring the at least one network node. According to some embodiments, the one or more other network nodes may or may not belong to the RA of the at least one network node. In an embodiment, apparatus 20 may be controlled by memory 24 and processor 22 to use the received information to determine an RA-related list of CAG IDs including the list of CAG IDs supported in the RA and CAG IDs supported by TAIs neighbouring the RA. According to certain embodiments, apparatus 20 may be controlled by memory 24 and processor 22 to filter the list of UE allowed CAG IDs using the RA-related list of CAG IDs to derive a RA-useful list of UE allowed CAG IDs.

In some embodiments, for example when a UE connects to a network node of its RA, apparatus 20 may be controlled by memory 24 and processor 22 to transmit to the at least one network node the RA-useful list of UE allowed CAG IDs as well as controlled to transmit to the UE the RA-useful list of UE allowed CAG IDs. In one example, the RA-useful list of UE allowed CAG IDs may be transmitted within a mobility restriction list IE contained in a NGAP initial context setup request message to the network node and within a NAS PDU information element of an NGAP message, such as an NGAP Initial Context Setup Request message towards the UE. According to certain embodiments, apparatus 20 may be controlled by memory 24 and processor 22 to, when the UE changes to a new RA via a network node of a neighbouring TAI, compute an updated RA-useful list of UE allowed CAG IDs and to transmit the updated list to the network node of the neighbouring TAI and may also be controlled to send the updated RA-useful list of UE allowed CAG IDs towards the UE.

Therefore, certain example embodiments provide several technological improvements, enhancements, and/or advantages over existing technological processes and constitute an improvement at least to the technological field of wireless network control and management. For example, as a result of certain embodiments described herein, signaling overhead and processing load can be reduced. Accordingly, the use of certain example embodiments results in improved functioning of communications networks and their nodes, such as base stations, NG-RAN nodes, eNBs, gNBs, and/or UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations required for implementing functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

A first embodiment is directed to a method that may include receiving, at a network node of a RA, a list of cells and their associated TAIs from at least one other network node, which may be connected to the network node over Xn. The method may then include determining which of the received TAIs are neighbouring TAIs of one of the TAIs of the network node. The method may also include building a list of neighbouring TAIs corresponding to the at least one other network node. The method may further include transmitting, to an AMF, a list of CAG IDs supported by the network node's TAIs and the list of neighbouring TAIs corresponding to the at least one other network node. The method may also include receiving from the AMF a RA-useful list of UE allowed CAG IDs, for example, when a UE connects via a network node of the UE's RA.

In a variant, the receiving of the RA-useful list of UE allowed CAG IDs may include receiving the RA-useful list of UE allowed CAG IDs within a mobility restriction list IE contained in a NGAP initial context setup request message.

According to a variant, the method may also include storing the received RA-useful list of UE allowed CAG IDs and optionally using it for connected mode mobility. In a further variant, the method may also include propagating the RA-useful list of UE allowed CAG IDs towards the UE, for example, via a NAS container.

In a variant, the receiving of the list of cells may include receiving the list in an Xn setup message from the at least one other network node.

In a variant, the determining which of the received TAIs are neighbouring TAIs of one of the TAIs of the network node may be done using knowledge of which cells are neighbouring cells of the network node's own cells.

A second embodiment is directed to a method that may include an AMF receiving, from at least one network node of a RA, information including a list of CAG IDs supported by the at least one network node's TAIs and a list of neighbouring TAIs corresponding to one or more other network nodes neighbouring the at least one network node. In some examples, the one or more other network nodes might not belong to the RA of the at least one network node. The method may also include determining, using the received information, an RA-related list of CAG IDs comprising the list of CAG IDs supported in the RA and CAG IDs supported by TAIs neighbouring the RA. The method may then include filtering the list of UE allowed CAG IDs using the RA-related list of CAG IDs to derive a RA-useful list of UE allowed CAG IDs. The method may include transmitting to the at least one network node the RA-useful list of UE allowed CAG IDs and may include transmitting to the UE the RA-useful list of UE allowed CAG IDs.

In a variant, the RA-useful list of UE allowed CAG IDs may be transmitted when a UE connects to a network node of the UE's RA.

In a variant, the transmitting of the RA-useful list of UE allowed CAG IDs may include transmitting the RA-useful list of UE allowed CAG IDs within a mobility restriction list IE contained in a NGAP initial context setup request message to the network node and transmitting the RA-useful list of UE allowed CAG IDs within a NAS PDU towards the UE in same NGAP initial context setup request message or equivalent NGAP message.

According to a variant, the method may further include, when the UE changes to a new RA via a network node of a neighbouring TAI, computing an updated RA-useful list of UE allowed CAG IDs and transmitting the updated list to the network node of the neighbouring TAI and transmitting it towards the UE.

A third embodiment is directed to an apparatus including at least one processor and at least one memory comprising computer program code. The at least one memory and computer program code may be configured, with the at least one processor, to cause the apparatus at least to perform the method according to the first embodiment or second embodiment, or any of the variants described above.

A fourth embodiment is directed to an apparatus that may include circuitry configured to perform the method according to the first embodiment or second embodiment, or any of the variants described above.

A fifth embodiment is directed to an apparatus that may include means for performing the method according to the first embodiment or second embodiment, or any of the variants described above.

A sixth embodiment is directed to a non-transitory computer readable medium comprising program instructions stored thereon for performing at least the method according to the first embodiment or second embodiment, or any of the variants described above.

The invention claimed is:

1. A method, comprising:
receiving, at a next generation radio access network (NG-RAN) node of a registration area, a list of cells and their associated tracking area identities (TAIs) from a second NG-RAN node of a second registration area;
determining, by the NG-RAN node, which cells of the received TAIs have cells neighbouring cells of the NG-RAN node;
based on determining which cells of the received TAIs have cells neighbouring cells of the NG-RAN node, determining, by the NG-RAN node, which of the received TAIs are neighbouring TAIs of a TAI of the NG-RAN node;
building, by the NG-RAN node, a list of neighbouring TAIs corresponding to the second NG-RAN node;
transmitting, by the NG-RAN node to an access management function, a list of closed access group identifiers (CAG IDs) supported by the TIA of the network node and the list of neighbouring TAIs corresponding to the second NG-RAN node; and
upon a user equipment connecting via the NG-RAN node, receiving, by the NG-RAN node from the access management function, a list of user equipment allowed CAG IDs within a mobility restriction list information element contained in a next generation application protocol initial context setup request message;
storing, by the NG-RAN node, the list of user equipment allowed CAG ID;
using, by the NG-RAN node, the list of user equipment allowed CAG ID for connected mode mobility; and
creating an initial context setup for the user equipment in the NG-RAN node.

2. The method of claim 1, wherein the user equipment uses the list of user equipment allowed CAG ID for idle mode mobility.

3. The method of claim 1, wherein the receiving of the list of cells comprises receiving the list in an Xn setup message from the second NG-RAN node.

4. The method of claim 1, further comprising transmitting the list of user equipment allowed CAG IDs to the user equipment.

5. The method of claim 3, wherein the mobility restriction list IE is contained in an initial context setup request message.

6. The method of claim 1, wherein the receiving of the list of user equipment allowed CAG IDs comprises receiving of the list of user equipment allowed CAG IDs when a user equipment connects via the NG-RAN node of its registration area.

7. The method of claim 1, further comprising: storing the received list of user equipment allowed CAG IDs and using it for connected mode mobility.

8. A next generation radio access network (NG-RAN) node of a first registration area, the NG-RAN node comprising:

at least one processor; and
at least one non-transitory memory including computer program code, the at least one non-transitory memory and the computer program code configured to, with the at least one processor, cause the NG-RAN node at least to:
receive a list of cells and their associated tracking area identities (TAIs) from a second NG-RAN of a second registration area;
determine which cells of the received TAIs have cells neighbouring cells of the apparatus;
based on determining which cells of the received TAIs have cells neighbouring cells of the apparatus, determine which of the received TAIs are neighbouring TAIs of a TAI of the apparatus;
build a list of neighbouring TAIs corresponding to the second apparatus;
transmit, to an access management function, a list of closed access group identifiers (CAG IDs) supported by the TIA of the NG-RAN node and the list of neighbouring TAIs corresponding to the second apparatus; and
upon a user equipment connecting via the NG-RAN node, receive, from the access management function, a list of user equipment allowed CAG IDs within a mobility restriction list information element contained in a next generation application protocol initial context setup request message;
store the list of user equipment allowed CAG ID;
use the list of user equipment allowed CAG ID for connected mode mobility; and
enabling an initial context setup for the user equipment to be created in the NG-RAN node.

9. The NG-RAN of claim 8, wherein the user equipment uses the list of user equipment allowed CAG ID for idle mode mobility.

10. The NG-RAN of claim 8, wherein the receiving of the list of cells comprises receiving the list in an Xn setup message from the second network node.

11. The NG-RAN of claim 8, wherein the NG-RAN is further caused to transmit the list of user equipment allowed CAG IDs to the user equipment.

12. The apparatus of claim 11, wherein the mobility restriction list IE is contained in an initial context setup request message.

13. The NG-RAN of claim 8, wherein the receiving of the list of user equipment allowed CAG IDs comprises receiving of the list of user equipment allowed CAG IDs when a user equipment connects via the NG-RAN of its registration area.

14. The NG-RAN of claim 8, the NG-RAN is further caused to store the received list of user equipment allowed CAG IDs and use it for connected mode mobility.

15. A system comprising:
a next generation radio access network (NG-RAN) of a first registration area, the NG-RAN comprising:
a processor; and
a non-transitory computer-readable memory comprising computer-executable instructions that, when executed by the processor, cause the processor to perform the following operations:
receive a list of cells and their associated tracking area identities (TAIs) from a second NG-RAN of a second registration area;
determine which cells of the received TAIs have cells neighbouring cells of the NG-RAN;
based on determining which cells of the received TAIs have cells neighbouring cells of the NG-RAN, determine which of the received TAIs are neighbouring TAIs of a TAI of the NG-RAN;
build a list of neighbouring TAIs corresponding to the second NG-RAN;
transmit, to an access management function, a list of closed access group identifiers (CAG IDs) supported by the TIA of the network node and the list of neighbouring TAIs corresponding to the second NG-RAN; and
upon a user equipment connecting via the NG-RAN node, receive, from the access management function, a list of user equipment allowed CAG IDs within a mobility restriction list information element contained in a next generation application protocol initial context setup request message;
store the list of user equipment allowed CAG ID;
use the list of user equipment allowed CAG ID for connected mode mobility; and
enable an initial context setup for the user equipment to be created in the NG-RAN node.

16. The system of claim 1, wherein the user equipment uses the list of user equipment allowed CAG ID for idle mode mobility.

17. The system of claim 16, wherein the receiving of the list of cells comprises receiving the list in an Xn setup message from the second network node.

18. The system of claim 17, wherein the computer-executable instructions further cause the processor to transmit the list of user equipment allowed CAG IDs to the user equipment.

19. The system of claim 18, wherein the mobility restriction list IE is contained in an initial context setup request message.

20. The system of claim 19, wherein receiving of the list of user equipment allowed CAG IDs comprises receiving of the list of user equipment allowed CAG IDs when a user equipment connects via the NG-RAN of its registration area.

* * * * *